May 13, 1958 R. M. BRAGG 2,834,377
SAFETY FLOW VALVE
Filed March 18, 1955

ROBERT M. BRAGG,
INVENTOR.

Huebner, Beehler, Worrel & Herzig
BY

ATTORNEYS.

United States Patent Office 2,834,377
Patented May 13, 1958

2,834,377

SAFETY FLOW VALVE

Robert M. Bragg, Fresno, Calif.

Application March 18, 1955, Serial No. 495,140

6 Claims. (Cl. 137—630.14)

The invention relates to valves and has particular reference to automatic shut-off valves for incorporation into filling valves which are used in filling or emptying fluid-containing tanks wherein the fluid is maintained under pressure.

During recent years the tendency has been very marked in the direction of storing fuels in tanks under pressure. Notable in this practice is the storage of liquid petroleum gas in pressure tanks for use as fuel in cooking and heating although sundry other types of fuels have also become prevalent for a variety of uses wherein storage in a compressed state in pressure containers facilitates their effective use. In the employment of liquid petroleum which is a very common fuel gas in certain portions of the country the practice is ordinarily to fill the storage tanks from the bottom. For that purpose sundry types of charging and discharging valves have heretofore been developed and have been employed with automatic seating valve elements unaccompanied by any auxiliary manual action. Because of the nature of liquid petroleum being a highly combustible semi-fluid fuel, precautions must be taken that the valve be not inadvertently opened at any time and especially during the filling or emptying operation thereby to spill the dangerous inflammable fuel on the premises. To this end an assortment of automatically closing valves have been attempted, the aim being that the valve will become closed should some accident happen to the line by which the fuel is passed to and from the tank. Those valves which have found some acceptance have been on the whole somewhat complicated valves involving an assortment of bypasses and numerous moving parts by virtue of which several valves are manipulated in a desired manner in an effort to promote the safety feature herein referred to. Those valves of a more simplified nature have been lacking in some of the essentials which are highly desirable, one defect being a lack of protection against out flow at a rate below the rated closure pressure of the valve. Inasmuch as the fluid line regularly connects at the bottom of a tank to a fitting located at the bottom, a common accident is one wherein the truck carrying the portable reservoir of fuel is moved without the fuel line being disconnected. This one accident has on many occasions fractured the fuel line and in some instances has broken the fitting. When such fracture or break occurs, there is strong likelihood that a sufficient quantity of the inflammable fuel will leak from the tank to create a very dangerous condition before the damage can be repaired. Since a firm connection from the fuel line to the tank fitting is mandatory, precautions to guard against the inadvertent spilling of fuel from the tank in the event of a fracture need be made in the valve itself.

It is therefore among the objects of the invention to provide a new and improved safety flow valve adapted to the filling of tanks containing semi-fluids under pressure which is simple in its design and sensitive in its action sufficient that the valve will automatically close with great rapidity should any fracture or break occur in the exterior of the valve or a pipe line connected to it and which is adapted to be manually closed for out flow below a rate necessary for automatic closure.

Another object of the invention is to provide a new and improved safety flow valve which is positive acting in that it will seat with assurance on those occasions where a seating action is desired to prevent inadvertent spilling of liquid from the tank.

Still another object of the invention is to provide a new and improved safety flow valve which is simple in its design and construction and which is compact to the extent that the valve when installed in a tank has only a small portion of the valve body on the exterior of the tank with the remaining operating portions lodged safely either within the flange to which the fitting is applied or within the tank itself.

Still another object of the invention is to provide a new and improved safety flow valve which is so constructed that it can be readily opened by manual means or by some appropriate power means at a remote location for the filling operation but which contains apparatus cooperating with the opening mechanism such that even when the valve has been forcibly opened for the injection of fuel it will nevertheless close automatically under those circumstances where reverse flow from the tank is excessively great.

Still further among the objects of the invention is to provide a compact, sensitive and positive-acting safety flow valve wherein operating parts are in alignment, thereby to facilitate fabrication and assembly and which is so constructed that means is provided to equalize pressure on opposite sides of the valve in order that it will respond promptly to the force of an opening spring of relatively light weight without sacrifice of the necessary sensitivity to prompt closing and to an early closing of a pressure compensating bleed made use of in promoting the sensitivity of the valve.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
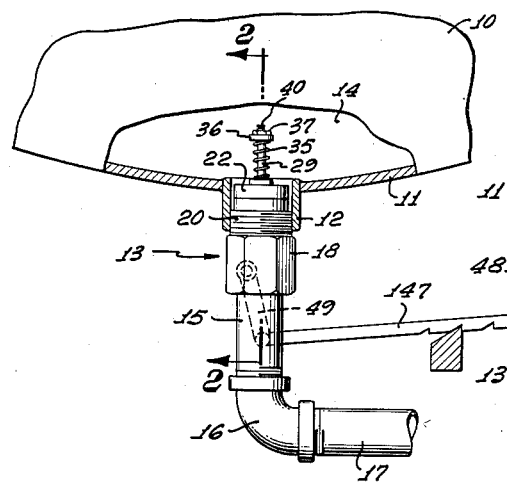
Figure 1 is a side elevational view of the valve installed in a tank with a portion of the tank broken away to reveal the manner in which the valve is installed.

In a form of the invention chosen for the purpose of illustration there is shown a liquid petroleum tank 10 having a bottom wall 11 provided with a flange 12 by means of which a safety flow valve device indicated generally by the reference character 13 can be mounted upon the bottom of the tank. The tank 10 presents an interior chamber 14 into which a portion of the valve device extends. A filling line consisting of a straight pipe 15, an elbow 16 and a pipe section 17 connects with the valve device at the bottom.

More particularly the valve device comprises a valve body 18 having an interiorly threaded end 19 to which the pipe section 15 attaches and an exteriorly threaded end 20 which is adapted to threadedly engage within the flange 12. Within the body is an exterior valve chamber 21. Forming a portion of the valve body is a cylindrical section 22 threadedly secured to the body portion 18 by the threads 23. The cylindrical section conveniently encloses an interior valve chamber 24. The valve chambers are separated one from another by a valve seat 25 which is annular in form and which also for convenience is formed within the interior of the cylindrical section 22. A packing ring 26 may be employed if needed to assure a tight connection between the cylindrical section and the body portion 18 first referred to. When connected they act as a single valve body. The cylindrical section, moreover, is made of an exterior circumference sufficiently smaller than the interior circumference of the flange 12 to fit comfortably within the flange. It will be noted further that the lower end of the body portion 18 has an integral inwardly extending flanged portion 27 adapted to give an additional mass of metal sufficient to have housed therein a portion of the operating mechanism.

A valve element 28 is disk-shaped and is adapted to seat upon the annular valve seat 25. It should be noted that the valve element presents a considerable area at the mid-portion of the interior chamber 24 directly in the path of the flow of fluid through the valve device. To support the valve element in proper position, the valve element has incorporated therein a tubular valve stem 29 which extends for a considerable distance upwardly to a location within the chamber 14 of the tank 10 when the valve device is installed in such tank. The tubular valve stem provides an interior passage 30. To support the valve stem a spider 31 is threadedly secured at its circumference 32 at the upper end of the cylindrical section 22. At the center of the spider is a downwardly extending sleeve 33 which slidably receives the tubular valve stem 29. At the upper end of the sleeve 33 is a cup 34 adapted to receive the lower end of a coiled spring 35, the upper end of which is contained in an inverted cup 36, the last identified cup being secured to the upper end of the valve stem. A lock nut 37 may be employed to hold the cup 26 in a selected position of adjustment. Movement of the cup up and down is provided for adjusting the sensitivity of the spring 35.

Extending through the interior of the valve stem is a shaft 38, the diameter of which is appreciably smaller than the interior diameter of the valve stem passage 30 such that the clearance between those last two defined parts provides a bleed passage 39 between the lower face of the valve element 28 and the uppermost end of the valve stem. The shaft 38 has a bleed passage closure 40 firmly affixed to the shaft and of such size that it is adapted to close the upper end of the bleed passage.

The shaft 38 is of considerable length and extends downwardly through a valve opening 41 defined by the annular valve seat 25 and thence downwardly to a position near the bottom of the exterior valve chamber 21. A spider 42 is mounted near the upper end of the exterior chamber 21 and has a central ring 43 with a suitable aperture therethrough adapted to slidably receive the shaft 38. A spring keeper 44 is secured to the spider 42 and serves as a support for a valve closing spring 45. The spring 45 is substantially heavier and stronger than the spring 35 first referred to which may be considered as a closure-resisting spring. A cup 46 secured to the lower end of the shaft 38 by a nut 47 forms a keeper for the lower end of the spring 45.

Figure 2:
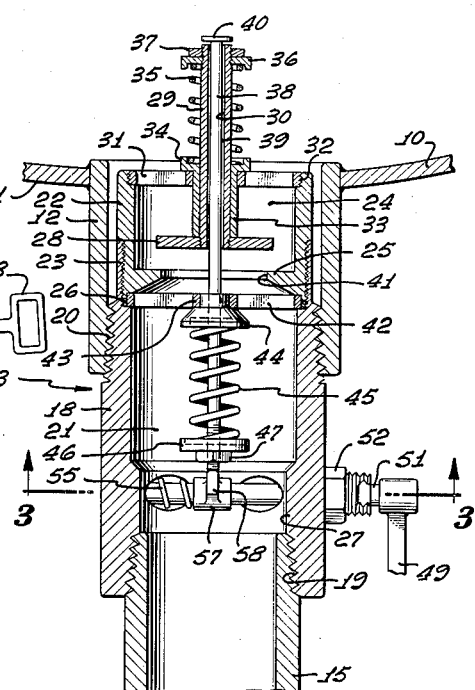
Figure 2 is a longitudinal sectional view taken on the line 2—2 of Figure 1.
Figure 3:
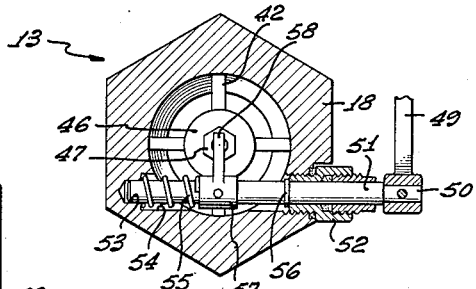
Figure 3 is a cross-sectional view taken on the line 3—3 of Figure 2.

In the form of the invention illustrated in Figures 1, 2 and 3 a manually actuated lever 147 having a handle 48 is adapted to forcibly open the valve device when opening is desired for the purpose of filling and emptying the tank through the filling line. The lever 147 connects to a link 49, the link in turn being non-rotatably pinned to a reduced end 50 of a shaft 51. The shaft in turn is rotatably mounted in the annular flange portion 27 and there secured by a packing fitting 52 near the outside end. The inside end of the shaft 51 is rotatably secured in a suitable recess 53 at the bottom of a spring-receiving recess 54. For convenience a spring 55 aids in maintaining a pressure on the bead 56.

On the shaft 51 is a bracket 57 non-rotatably attached thereto, the bracket being provided with an arm 58, the end of which lies beneath and is adapted to bear against the lowermost end of the shaft 38 as is particularly shown in Figure 2.

In the operation of this form of the device let it be assumed that the valve device is to be placed in such position as it would have when the tank 10 is being filled. This means that the lever 147 has been pulled to a position wherein the arm 58 has lifted the shaft 38 against the tension of spring 45 to the position illustrated in Figure 2. In that position the closure 40 will be elevated above contact with the uppermost end of the sleeve 29 and the spring 35 lighter than the spring 45 will be enabled to elevate the valve element 28 to its position shown in Figure 2 spaced well above the annular valve seat 25. The valve device is now ready to admit fuel flowing into the tank from the fuel line. The fuel passes through the opening 41 and upwardly around the outside edge of the valve element 28, through the interior chamber into the chamber 14 of the tank. Should there occur a fracture or break in the fuel line, indicated by the parts 15, 16 and 17, or in fact a break or fracture in the body portion 18, or in the hose used to connect the tank being emptied into tank 10, the tendency will immediately be for fuel under pressure within the tank chamber 14 to rush outwardly. The effect of this outward rush of fuel, be it gas or liquid, causes the fuel to impinge upon the upper side of the valve device 28 exerting a pressure upon the valve device sufficient to move it downwardly against the pressure of the spring 35 until the valve element closes upon the annular seat 25, thereby preventing further egress of the contents of the tank. Under those circumstances where the lever 147 has already been manipulated to forcibly lift the shaft 38, the closure 40 will be elevated above the bleed passage and some fluid will gain egress through the bleed passage. The bleed passage, however, is of sufficiently small capacity that only a very small amount of the contents of the tank can leak out in this fashion before the lever 45 can be shifted to effect closing of the valve by virtue of action of the heavier spring 45.

When the lever 147 has been thus moved to a position enabling the heavier spring 45 to act, that is to say, to a position wherein the arm 58 of the bracket 57 is moved down below a point of contact with the lower end of the shaft 38, the spring 45 by pressure against the cup 46 forces the shaft downwardly. Movement of the shaft downwardly causes the closure 40 to bear against the upper end of the shaft 38, thereby to close the bleed passage.

With the valve element 28 closed, the pressure against the upper side or inside face of the valve element will normally be greater than atmospheric pressure on the outside. When the lever 147 is moved to a position compressing the spring 45 and elevating the shaft 38, the difference in pressure may be so great that the relatively light tension of the spring 35 under ordinary circumstances would be insufficient to lift the valve element 28 from its seat. By reason of the fact, however, that when the shaft 38 is elevated the closure 40 is lifted opening the bleed passage, fluid pressure on opposite sides of the valve element 28 is equalized under conditions where a rupture might occur in service line 17 to the extent that the spring 35 is enabled to lift the valve element to the position shown in Figure 2.

Figure 4:
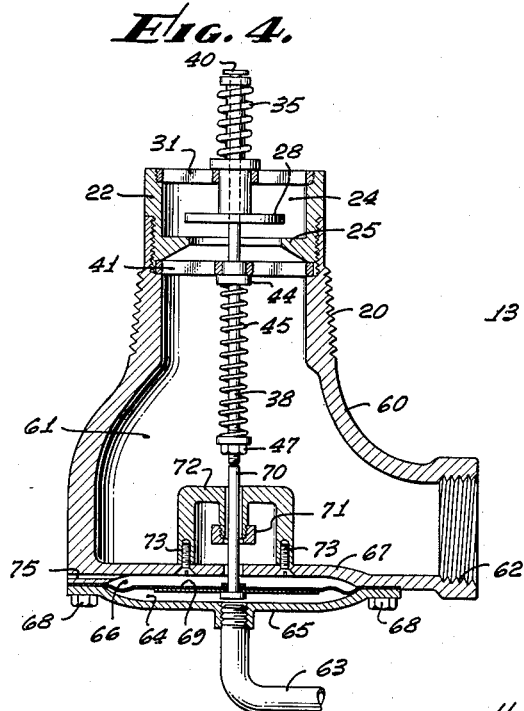
Figure 4 is a longitudinal sectional view of a modified form of the invention.

In the form of the device illustrated in Figure 4 there is provided for the valve device a body 60 including an exterior chamber 61. This body is somewhat different in its physical form from the body portion 18 previously described except for the upper end of the body where it joins the cylindrical section 22 providing the annular valve seat 25 previously described. In this form of the invention a side opening 62 may be employed to which a suitable fuel line can be connected. Instead of the lever 47 operated by handle 48 there is provided a remote control for forcibly lifting the valve stem 38 against spring 45, thereby allowing spring 35 to lift the valve element 28 from its seat. An example of remote control is embodied in a fluid pressure line 63 by means of which liquid or gas under pressure can be introduced into a pressure chamber 64 formed by attachment of a hollow plate 65 over a recess 66 in a lower wall 67 of the valve body 60. Screws 68 seal a diaphragm 69 in a position wherein the fluid under pressure is separated from the pressure within the chamber 61. The recess 66 is vented by means of a vent 75. A stub shaft 70 is secured at the center of the diaphragm by some conventional means and the stub shaft extends upwardly through a packing gland 71 to a position wherein the upper end of the stub shaft 70 bears directly upon the bottom of the shaft 38. To assist in locating the stub shaft in reciprocating position a cup or spider 72 may be attached by means of suitable screws 73 in a position such as to guide the stub shaft 70 in its sliding motion, which motion is induced by the application of fluid under pressure to the under side of the diaphragm. The diaphragm may be made sufficiently flexible so that it permits a throw of the stub shaft and consequently the shaft 38 sufficient to lift the valve element 28 to open position as shown in Figure 4. Here as previously described the valve element can close should the flow of fluid against the upper side of valve element 28 be sufficient to overcome the tension in the spring 35 in the same fashion as previously described in connection with Figures 1, 2 and 3. A vent 75 for the recess 66 assures free moving operation of the diaphragm 69.

There has accordingly been described herein a safety flow valve of simple construction wherein the operating parts are substantially concentric in their alignment and so designed that they can be readily fabricated by simple and inexpensive means and assembled in a manner to provide a sensitive, positive operating device.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In combination with a fluid pressure tank a safety tank filling valve device for charging and discharging fluid comprising a valve body having a hollow section forming an exterior chamber, a hollow section comprising part of said tank forming an interior chamber, means releasably joining said sections together in axial alignment, and a valve seat intermediate said chambers, a disc valve element in the fluid path through the interior chamber adapted to engage said seat, and including a valve stem slidably mounted in the interior chamber and a closure-resisting spring between the valve body and the stem normally urging said valve device to unseated position, a valve closing shaft extending through the stem and the valve and having a lost motion connection therebetween, a closing spring of strength greater than the first spring acting between the shaft and the body normally biased to close said valve element, and valve-operating means extending to the exterior section of the valve body and in engagement with said shaft and adapted to move said shaft in a direction inwardly against tension of the closing spring to a valve releasing position.

2. A safety tank valve device for charging and discharging fluid comprising a valve body having an exterior chamber, an interior chamber, and a valve seat intermediate said chambers, a disc valve element in the fluid path through the interior chamber adapted to engage said seat and including a valve stem slidably mounted in the inner chamber, and a closure-resisting spring between the valve body and the stem normally urging said valve device to unseated position, a valve closing shaft extending through the interior chamber to a position of engagement with the valve element, said stem and said valve closing shaft being axially slidable relative to each other and having a lost motion connection therebetween, means providing a bleed passage between said chambers on opposite sides of the valve element, a valve closing spring of strength greater than the first spring acting between the shaft and the body normally biased to close said valve element, valve-operating means extending into lifting engagement with said shaft adapted to move said shaft in a direction inwardly against tension of the closing spring to a valve releasing position, a bleed closure on the shaft in a position overlying said bleed passage and having a position closing said passage when the valve-closing shaft is moved to valve-closing position, said closure having a position opening said bleed passage when the valve-closing shaft is moved to valve-releasing position whereby to equalize pressures on opposite sides of said valve element thereby to effect opening of said valve element by action of said closure-resisting spring.

3. A safety tank valve device for charging and discharging fluid comprising a valve body having an exterior chamber, an interior chamber, and a valve seat intermediate said chambers, a disc valve element in the fluid path through the interior chamber adapted to engage said seat, a hollow valve stem for the valve element forming a bleed passage, a guide sleeve in the inner chamber slidably mounting said stem, and a closure-resisting spring between the valve body and the stem normally urging said valve device to unseated position, a valve-closing shaft extending through the stem and the valve, guide means in the exterior chamber slidably mounting said shaft, a closing spring of strength greater than the first spring acting between an outer end of the shaft and the guide means normally biased to close said valve element, said guide means in the exterior chamber including valve-operating means extending into endwise engagement with said shaft and adapted to move said shaft in a direction inwardly against tension of the closing spring to a valve-releasing position, a bleed closure on the shaft in a position overlying said bleed passage and having a position of engagement with the valve stem and closing said passage when the valve-closing shaft is moved to valve-closing position, said closure having a position opening said bleed passage when the valve-closing shaft is moved to valve-releasing position whereby to equalize pressures on opposite sides of said valve element.

4. A safety shut-off charging and discharging valve device for liquid petroleum tanks comprising a main valve body having an exterior chamber, a secondary valve body sealed in endwise relation to said main valve body and having an interior chamber therein, and a valve seat intermediate said chambers, said body having an exteriorly threaded tank-engaging end surrounding the interior chamber, a disc valve element in the fluid path through the interior chamber adapted to engage said seat, a hollow valve stem for the valve element, a guide sleeve in the inner chamber slidably receiving said stem, and a closure-resisting spring between the sleeve and the stem normally urging said valve device to unseated position, a valve closing shaft extending through the stem and the valve element with a clearance providing a bleed passage therebetween and having a guided support in the exterior chamber, a closing spring of strength greater than the first spring acting between the shaft and the body normally biased to close said valve element, manually rotatable valve-operating means extending to the exterior of the valve body and into endwise engagement with said shaft and adapted to move said shaft in a direction inwardly against tension of the closing spring to a valve-releasing position, a bleed closure on the shaft in a position overlying said bleed passage and having a position of engagement with the valve stem and closing said passage when the valve-closing shaft is moved to valve-closing position, said closure having a position opening said bleed passage when the valve-closing shaft is moved to valve-releasing position whereby to equalize pressures on opposite sides of said valve element thereby to effect opening of said valve element by action of said closure-resisting spring.

5. A safety shut-off valve device comprising a valve body having an exterior chamber, an interior chamber providing a flow passage to the exterior chamber, an annular valve seat between the chambers and a valve element in the interior chamber adapted to close on said seat, a guide in the interior chamber and a valve stem for the valve element slidably mounted in the guide and a closure-resisting spring between the stem and the guide biased to normally urge said valve element to open position, means forming a central passageway through said valve element and said stem, a shaft extending through the passageway leaving a clearance to provide a bleed passage, a bleed passage closure on one end of the shaft having one position closing said bleed passage and another position opening said bleed passage, said body having a guide in the exterior chamber in operating alignment with the first guide, a portion of the shaft having a slidable mounting in the guide in said exterior chamber, an automatic closure enabling means mounted between the outer end of the shaft and said body biased in a direction to effect closure of the valve element, an actuating means operable in a direction when the shaft is at one position to enable movement of said shaft to a position effecting closing of said valve element and said bleed passage, said actuating means being operable in another direction when said shaft is at another position to effect movement of said shaft against the bias of said closure enabling means whereby to enable opening of said valve element by said closure-resisting spring.

6. A safety tank valve device for charging and discharging fluid comprising a valve body having an exterior chamber, an interior chamber, and a valve seat intermediate said chambers, a disc valve element in the fluid path through the interior chamber adapted to engage said seat, a hollow valve stem for the valve element, a guide sleeve in the inner chamber slidably receiving said stem, and a closure-resisting spring between the sleeve and the stem normally urging said valve device to unseated position, a valve-closing shaft extending through the stem and the valve, said stem and said valve closing shaft being axially slidable relative to each other and having a lost motion connection therebetween, a closing spring of strength greater than the first spring acting between the shaft and the body normally biased to close said valve element, a pressure-tight diaphragm chamber on the body having a flexible diaphragm therein, said shaft being connected to said diaphragm, a pressure line to said chamber, said diaphragm being adapted to move said shaft in a direction inwardly against tension of the closing spring to a valve-releasing position.

References Cited in the file of this patent

UNITED STATES PATENTS

| | | |
|---|---|---|
| 966,509 | Wulf | Aug. 9, 1910 |
| 2,299,649 | Paille | Oct. 20, 1942 |